(12) United States Patent
Emery (10) Patent No.: US 8,395,296 B2
(45) Date of Patent: Mar. 12, 2013

(54) TAPE STRUCTURE WITH CONDUCTIVE OUTER SIDE AND ELECTRICALLY INSULATING INNER SIDE

(75) Inventor: Franklin T. Emery, Eighty Four, PA (US)

(73) Assignee: Siemens Energy, Inc., Orlando, FL (US)

( * ) Notice: Subject to any disclaimer, the term of this patent is extended or adjusted under 35 U.S.C. 154(b) by 374 days.

(21) Appl. No.: 12/560,559

(22) Filed: Sep. 16, 2009

(65) Prior Publication Data

US 2011/0062816 A1    Mar. 17, 2011

(51) Int. Cl.
*H02K 1/00*         (2006.01)
*H02K 3/40*         (2006.01)
*H01B 13/06*        (2006.01)

(52) U.S. Cl. ............... 310/196; 156/53; 156/52; 156/55

(58) Field of Classification Search .................. 310/196; 156/53, 52, 55
See application file for complete search history.

(56) References Cited

U.S. PATENT DOCUMENTS

| | | | | |
|---|---|---|---|---|
| 1,781,521 A | * | 11/1930 | Palmer et al. ............. | 174/122 R |
| 1,959,526 A | * | 5/1934 | Del Mar ............................... | 57/7 |
| 2,374,514 A | * | 4/1945 | Swale ............................ | 156/55 |
| 3,155,768 A | * | 11/1964 | Garshick .................... | 174/101.5 |
| 3,759,734 A | * | 9/1973 | Mendelsohn et al. ........ | 428/184 |
| 3,930,915 A | * | 1/1976 | Mendelsohn et al. .......... | 156/53 |
| 4,329,538 A | * | 5/1982 | Meyer ....................... | 174/119 R |
| 4,403,163 A | | 9/1983 | Armerding et al. | |
| 4,760,362 A | * | 7/1988 | Maki ............................ | 333/237 |
| 4,853,565 A | * | 8/1989 | Elton et al. ..................... | 310/45 |
| 5,175,396 A | | 12/1992 | Emery et al. | |
| 5,434,354 A | * | 7/1995 | Baker et al. ..................... | 174/36 |
| 5,464,949 A | * | 11/1995 | Markovitz et al. ........ | 174/120 R |
| 5,633,477 A | | 5/1997 | Smith et al. | |
| 5,925,944 A | * | 7/1999 | Emery et al. .................... | 310/45 |
| 6,103,382 A | | 8/2000 | Smith et al. | |
| 6,140,733 A | | 10/2000 | Wedde et al. | |
| 6,190,775 B1 | | 2/2001 | Smith et al. | |
| 6,226,163 B1 | | 5/2001 | Bernhoff et al. | |
| 6,417,456 B1 | | 7/2002 | Leijon et al. | |
| 6,420,812 B1 | | 7/2002 | Emery | |
| 6,498,415 B1 | | 12/2002 | Emery | |

(Continued)

FOREIGN PATENT DOCUMENTS

DE         3200366 A1      12/1982
DE       19536209 A1      12/1996

(Continued)

OTHER PUBLICATIONS

Translation of foreign document FR 2499306 A.*

*Primary Examiner* — Tran N. Nguyen
*Assistant Examiner* — Alex W Mok (57) ABSTRACT

A wrapped stator coil for use in a generator. The wrapped stator coil includes an electrical conductor bar, a laminate tape structure, and a conductive structure. The laminate tape structure is disposed about the electrical conductor bar and includes an insulative first layer adjacent the conductor bar and a conductive second layer bonded to the first layer. The conductive structure includes a first end portion, an intermediate portion and a second end portion. The first end portion is in contact with the electrical conductor bar. The intermediate portion is in contact with the conductive second layer and is not in contact with the electrical conductor bar. The insulating layer is disposed about the conductive structure and the laminate tape.

18 Claims, 4 Drawing Sheets

U.S. PATENT DOCUMENTS

| | | |
|---|---|---|
| 6,559,384 B1 * | 5/2003 | Angell et al. .................. 174/116 |
| 6,624,547 B1 | 9/2003 | Emery |
| 6,677,848 B1 | 1/2004 | Emery |
| 6,768,240 B2 * | 7/2004 | Younsi et al. .................. 310/201 |
| 6,798,107 B2 | 9/2004 | Leijon |
| 7,026,554 B2 | 4/2006 | Lee et al. |
| 7,135,639 B2 | 11/2006 | Emery |
| 7,553,438 B2 | 6/2009 | Smith et al. |
| 2006/0214530 A1 * | 9/2006 | Emery et al. .................. 310/213 |
| 2007/0114052 A1 | 5/2007 | Emery |
| 2008/0284262 A1 | 11/2008 | Nelson et al. |
| 2009/0078450 A1 | 3/2009 | Miller et al. |

FOREIGN PATENT DOCUMENTS

| | | |
|---|---|---|
| FR | 2499306 A * | 8/1982 |
| WO | 0035791 A1 | 6/2000 |

* cited by examiner

TAPE STRUCTURE WITH CONDUCTIVE OUTER SIDE AND ELECTRICALLY INSULATING INNER SIDE

FIELD OF THE INVENTION

The present invention relates in general to stator coils for use in electrical generators and, more particularly, to a laminate tape structure for a stator coil, the laminate tape structure including an electrically insulating inner layer and a conductive outer layer.

BACKGROUND OF THE INVENTION

High-voltage stator coils are used in high-voltage electrical generators. A stator coil can be formed including an electrical conductor bar that, in turn comprises one or more electrical conductors. The electrical conductors individually are formed of a highly conductive material, such as copper. The electrical conductors are bundled together to form the conductor bar.

In one prior art configuration of a stator coil, an inner corona protection system is provided over an electrical conductor bar comprising a first layer of mica paper tape applied directly over the conductor bar, which first layer of mica paper tape may be referred to as a "top cap." The top cap is applied over the conductor bar such that a first end portion of the conductor bar is exposed and is not covered by the top cap. A second mica paper tape layer is edge lapped about the conductor bar and the top cap. The second layer is applied over the conductor bar such that the first end portion of the conductor bar is exposed and is not covered by the second layer.

A conductive structure, such as a thin copper strip, is applied over the conductor bar, the top cap, and the second layer. A first end of the conductive structure contacts the exposed first end portion of the conductor bar. An intermediate portion of the conductive structure contacts the second layer of mica paper tape. A second end of the conductive structure is not in contact with the conductor bar or the second layer of mica paper tape. A conductive tape layer is edge lapped about the conductive structure, the top cap, and the second layer of mica paper tape, but not over the exposed first end portion of the conductor bar. The conductive structure transfers the electrical potential from the conductor bar to the conductive tape layer, such that the conductor bar, the conductive structure, and the conductive tape layer are all at the same electrical potential.

A total thickness of the applied top cap, the second layer of mica paper tape, the conductive structure, and the conductive tape according to this prior art configuration may be from about 0.019 inches to about 0.023 inches.

SUMMARY OF THE INVENTION

In accordance with one aspect of the invention, a wrapped stator coil is, provided for use in a generator. The wrapped stator coil comprises an electrical conductor bar, a laminate tape structure, and a conductive structure. The laminate tape structure is disposed about the electrical conductor bar and comprises an insulative first layer adjacent the conductor bar and a conductive second layer bonded to the first layer. The conductive structure includes a first end portion, an intermediate portion and a second end portion. The first end portion is in contact with the electrical conductor bar. The intermediate portion is in contact with the conductive second layer and is not in contact with the electrical conductor bar. The insulating layer is disposed about the conductive structure and the laminate tape.

The first layer may comprise a mica paper layer, which may be glass backed.

The second layer may comprise a polyester felt loaded with carbon.

The laminate tape structure may have a thickness less than about 0.015 inch.

The laminate tape structure may be edge lapped.

The conductive structure may comprise a metal strip, and may be held in place on the laminate tape structure via one or more tape strips.

The electrical conductor bar may comprise a substantially straight portion, and the laminate tape structure may be disposed about the straight portion of the electrical conductor bar.

In accordance with a second aspect of the invention, a method is provided for applying an inner corona protection system to an electrical conductor bar. A laminate tape structure is wrapped about the electrical conductor bar. The laminate tape structure comprises an insulative first layer adjacent the electrical conductor bar and a conductive second layer bonded to the first layer. A conductive structure is provided having a first end portion, an intermediate portion and a second end portion. The first end portion is in contact with the electrical conductor bar. The intermediate portion is in contact with the conductive second layer and is out of contact with the electrical conductor bar.

Wrapping the laminate tape structure may comprise wrapping the laminate tape structure with a small overlap.

The metal strip may be secured to the laminate tape structure via one or more tape strips.

In accordance with a third aspect of the invention, a laminate tape structure adapted to be disposed about an electrical conductor bar is provided. The laminate tape structure comprises an insulative first layer and a conductive second layer bonded to the first layer. The laminate tape structure has a thickness less than about 0.015 inch.

The second layer may comprise a polyester felt loaded with carbon so as to have a resistance of 50 ohms/square.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
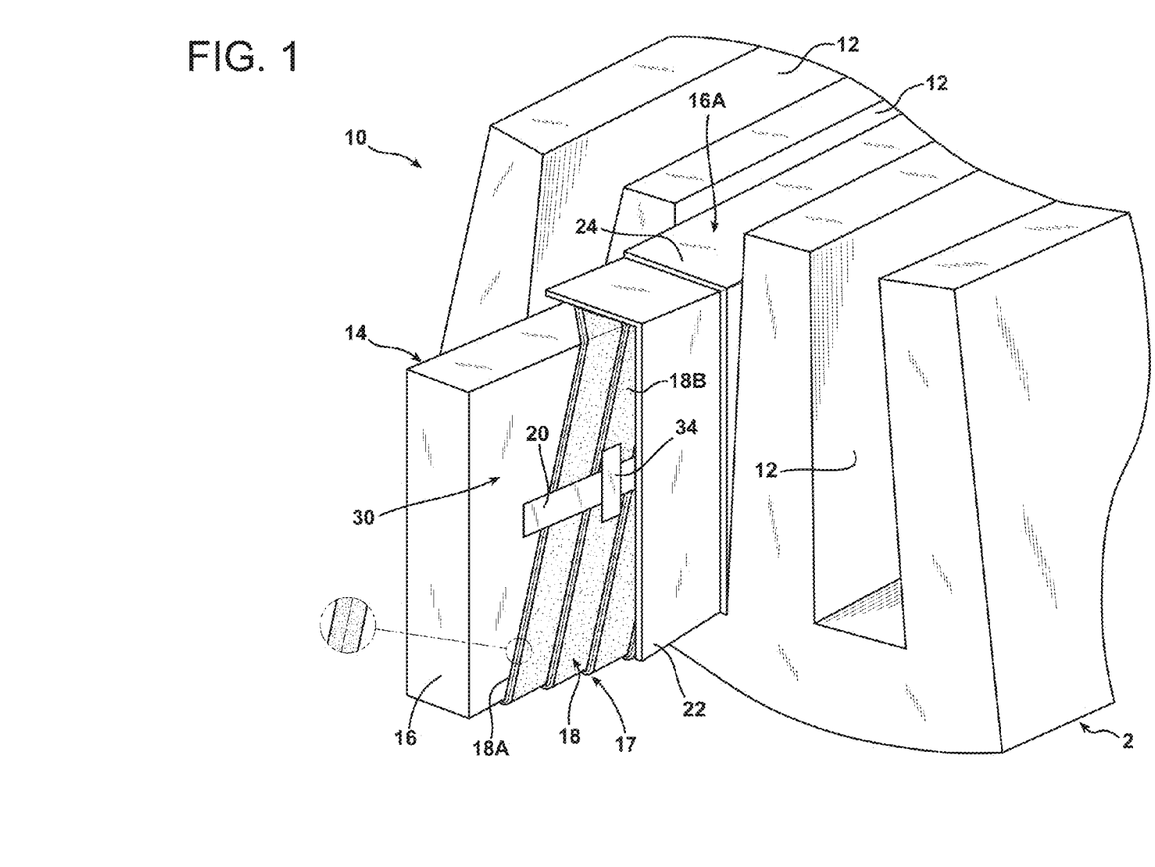
FIG. 1 is a perspective view of a portion of a stator for a generator core and including a partial cut away view of a wrapped stator coil according to an embodiment of the present invention.

Referring to FIG. 1, a portion of a supporting body 2 of a stator 10 in an electrical generator is illustrated including a plurality of slots 12, where each slot is adapted to receive a wrapped stator coil 14 (only one shown in FIG. 1). As additionally seen in FIGS. 2 and 3, the wrapped stator coil 14 generally comprises an electrical conductor bar 16, which may comprise one or more electrical conductors bundled together. The electrical conductor bar 16 includes a substantially straight portion 16a, see FIGS. 1 and 3. The electrical conductor bar 16 may also include a first end turn (not shown) adjacent to a first end portion 30 of the straight portion 16a, and a second end turn (not shown) adjacent to a second end 32 of the straight portion 16a. The end turns of the electrical conductor bar 16 may be electrically connected to end turns of a second electrical conductor bar (not shown) to form a full stator coil about a rotor (not shown) of the electrical generator.

Figure 3:
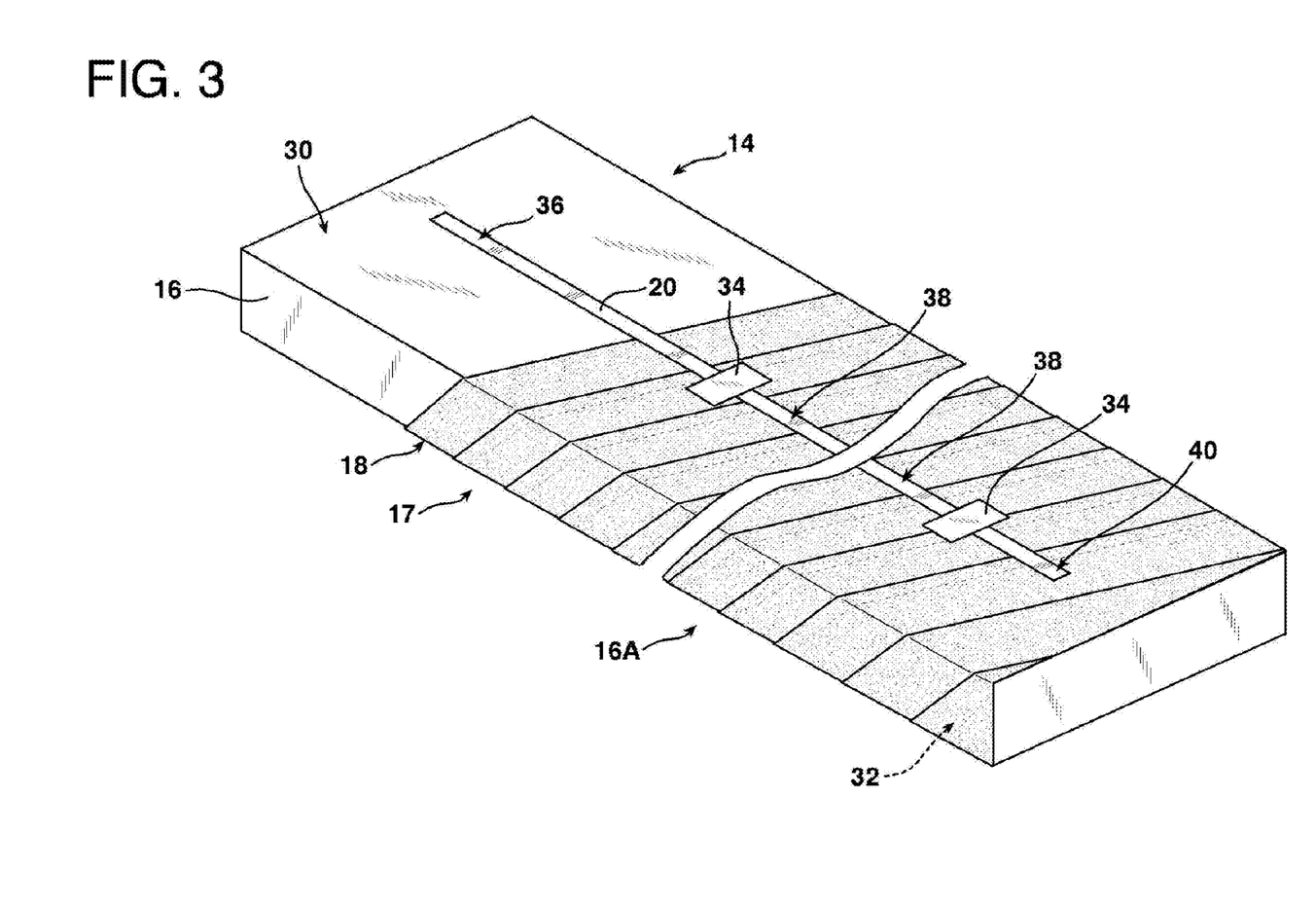
FIG. 3 is a perspective view of the wrapped stator coil shown in FIG. 1, wherein an insulating layer and an outer layer thereof have been removed for clarity.

The wrapped stator coil 14 also comprises an inner corona protection system 17 provided over the straight portion 16a of the electrical conductor bar 16. The corona protection system 17 may comprise a laminate tape structure 18 in accordance with an embodiment of the present invention and described further below and a conductive structure 20, which may comprise a thin metal, e.g., copper, strip. The wrapped stator coil 14 may further comprise over the inner corona protection system 17 a dielectric insulating layer 22, also known as a groundwall, which may generally comprise a glass backed resin impregnated mica paper tape, and which may also be provided over the end turns of the electrical conductor bar 16. The wrapped stator coil 14 may further comprise over the dielectric insulating layer 22 a conductive or a partially conductive outer layer 24 that may be a silicon carbide filled varnish treated glass fabric. It is noted that the insulating layer 22 and the conductive outer layer 24 have been broken away in FIG. 1 for clarity, and that the insulating layer 22 and the conductive outer layer 24 are preferably disposed about the entire straight portion 16a of the conductor bar 16. Further, the insulating layer 22 and the conductive outer layer 24 have been removed from FIG. 3 for clarity. Additionally, the dimensions of the electrical conductor bar 16 in FIGS. 1 and 3 are shown for illustration purposes, and may vary from that shown.

Figure 2:
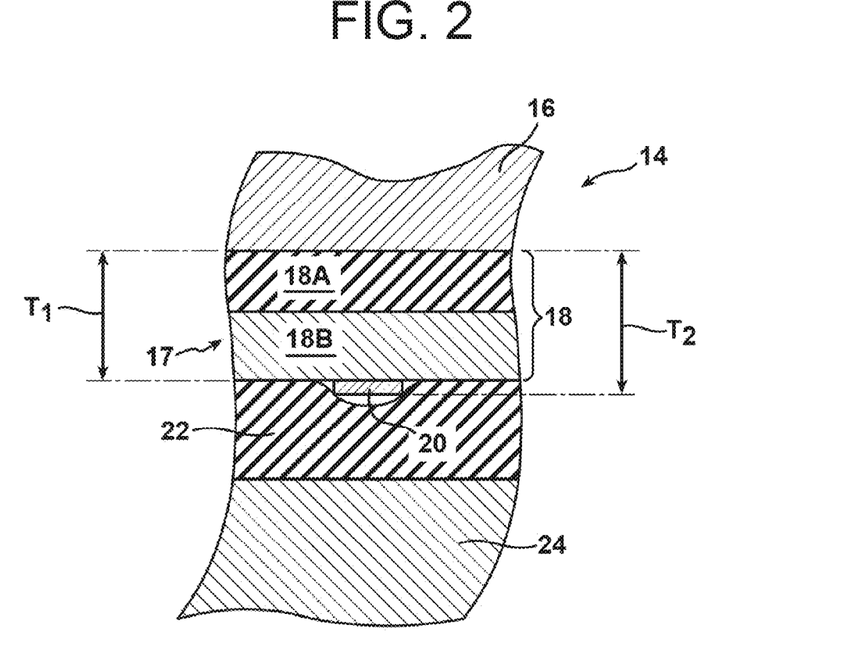
FIG. 2 is a diagrammatic cross-sectional view of a portion of the wrapped stator coil shown in FIG. 1.

Referring to FIGS. 1 and 2, the laminate tape structure 18 comprises an insulative first layer 18A adjacent the straight portion 16a of the electrical conductor bar 16, i.e., defining an inner side of the laminate tape structure 18. The laminate tape structure 18 further comprises a conductive second layer 18B bonded to the first layer 18A, i.e., defining an outer side of the tape structure 18 opposed from the inner side. In a preferred embodiment, a thickness $T_1$ (see FIG. 2) of the laminate tape structure 18 is less than about 0.015 inch, preferably between about 0.009 inch and about 0.015 inch, and, in a most preferred embodiment, is about 0.009 inch. The thickness of the insulative first layer 18A according to the most preferred embodiment may be about 0.005 inch, and the thickness of the conductive second layer 18B according to the most preferred embodiment may be about 0.004 inch. The insulative first layer 18A preferably comprises a glass backed mica paper layer, such as an 80 gram/meter squared tape, and may include a bonding resin for bonding the conductive second layer 18B to the insulative first layer 18A. The bonding resin may comprise a thermoset, low viscosity liquid resin including an epoxy based material or a polyester based material, such as is typically used in electrical insulation applications. For example, the bonding resin may comprise a styrenated epoxy. Further, the insulative first layer 18A may include an accelerator in the bonding resin, such as zinc naphthenate, as will be discussed in detail herein.

The conductive second layer 18B in the embodiment shown comprises a polyester felt loaded with an amount of electrically conductive carbon so as to achieve a resistance of the conductive second layer 18B of about 50 ohms/square, but may comprise other suitable electrically conductive layers.

As noted above, the insulative first layer 18A defines the inner side of the laminate tape structure 18 and is adjacent to and directly contacts the straight portion 16a of the electrical conductor bar 16. Thus, the conductive second layer 18B, which defines the opposed outer side of the tape structure 18, is completely out of contact with the electrical conductor bar 16. Avoiding contact between the electrical conductor bar 16 and the conductive second layer 18B is desirable, as contact therebetween can create excessive current flow in the conductive structure 20, which may decrease the performance of the generator and/or damage the wrapped stator coil 14.

As shown in FIGS. 1 and 3, the laminate tape structure 18 is edge lapped about the straight portion 16a of the electrical conductor bar 16. The laminate tape structure 18 may be edge lapped with only a small overlap between the adjacent wraps thereof. The small overlap between adjacent wraps is sufficient to prevent the formation of gaps between the adjacent wraps. For example, the laminate tape structure 18 may have a width of about 1-1.2 inch, and an edge of one wrap may overlap about 5-10% of an adjacent wrap.

While the majority of the straight portion 16a of the electrical conductor bar 16 in the embodiment shown is wrapped with the laminate tape structure 18, the first end portion 30 of the straight portion 16a of the electrical conductor bar 16 is exposed, i.e., the laminate tape structure 18 is not wrapped about the first end portion 30 of the straight portion 16a of the electrical conductor bar 16. Thus, the conductive structure 20 may contact the first end portion 30, as will be discussed below. The second end portion 32 (see FIG. 3) of the straight portion 16a of the electrical conductor bar 16 is wrapped with the laminate tape structure 18.

The conductive structure 20, which, as noted above, may comprise a thin copper strip, has a first end portion 36 disposed over the straight portion 16a of the electrical conductor bar 16 and an intermediate portion 38 disposed over the conductive second layer 18B of the laminate tape structure 18. As shown in FIGS. 1 and 3, the conductive structure 20 may be secured to the laminate tape structure 18, i.e., to the conductive second layer 18B on an opposite side of the conductive second layer 18B than the insulative first layer 18A, using one or more tape strips 34, such as, for example, NOMEX adhesive tape strips (NOMEX is a registered trademark of E.I. Du Pont De Nemours and Company).

Referring to FIG. 3, the first end portion 36 of the conductive structure 20 contacts the exposed first end portion 30 of the straight portion 16a of the electrical conductor bar 16. The contact between the exposed first end portion 30 of the straight portion 16a of the electrical conductor bar 16 and the first end portion 30 of the conductive structure 20 may be secured by soldering or otherwise directly connecting the conductive structure 20 to the electrical conductor bar 16.

The intermediate portion 38 of the conductive structure 20 contacts the conductive second layer 18B of the laminate tape structure 18, but does not contact the electrical conductor bar 16 and is substantially out of contact with the insulative first layer 18A of the laminate tape structure 18.

A second end portion 40 of the conductive structure 20 contacts the conductive second layer 18B of the laminate tape structure 18, but is not in contact with the electrical conductor bar 16. In the embodiment shown, the second end portion 32 of the straight portion 16a of the electrical conductor bar 16 extends axially about 2 inches further than the second end portion 40 of the conductive structure 20. Optionally, the second end portion 40 of the conductive structure 20 may include electrical insulation (not shown) to electrically insulate the second end portion 40 of the conductive structure 20 in the case of contact with the electrical conductor bar 16.

Since the first end portion 36 of the conductive structure 20 contacts the exposed first end portion 30 of the straight portion 16a of the electrical conductor bar 16, the electrical potential, i.e., voltage, of the electrical conductor bar 16 is transferred to the conductive structure 20. Further, since the intermediate portion 38 of the conductive structure 20 contacts most if not all of the wraps of the conductive second layer 18B of the laminate tape structure 18, the conductive structure 20 electrically connects each of the wraps of the conductive second layer 18B together, thereby ensuring a low resistance inner corona protection system 17. Further, the conductive structure 20 transfers the electrical potential of the electrical conductor bar 16 to the conductive second layer 18B of the laminate tape structure 18 such that the electrical potential is equally distributed to the wraps of the conductive second layer 18B of the laminate tape structure 18.

The laminate tape structure 18 described herein can be used to prevent contact between the electrical conductor bar 16 and the intermediate and second end portions 38 and 40 of the conductive structure 20, yet still allow contact by the first end portion 38 of the conductive structure 20 with the first end portion 30 of the straight portion 16a of the electrical conductor bar 16. This is beneficial, as contact between the conductive structure 20 and the electrical conductor bar 16 at a second location on the conductor bar 16, in addition to the contact between their respective first end portions 30, 38, would create a path for electrical current to flow through the conductive structure 20 back to the conductor bar 16. If electrical current were permitted to flow through the conductive structure 20 back to the conductor bar 16, the electrical current could fuse/short the conductive structure 20, which may result in destruction thereof. However, since there is only one contact point between the electrical conductor bar 16 and the conductive structure 20, no electrical current path through the conductive structure 20 back to the conductor bar 16 exists, i.e., from one contact point with the electrical conductor bar 16 to another contact point with the electrical conductor bar 16. Thus, any electrical current flowing through the electrical conductor bar 16 does not pass through the conductive structure 20 back to the conductor bar 16, which reduces the risk of destroying the conductive structure 20.

It is noted that the use of the laminate tape structure 18 between the conductive structure 20 and the electrical conductor bar 16 is sufficient to prevent contact between the electrical conductor bar 16 and the conductive structure 20, other than between their respective first end portions 30, 38, even in the case of tearing/splitting of the laminate tape structure 18. This is because the laminate tape structure 18 is of a sufficient thickness, i.e., about 0.009 inch in the most preferred embodiment, that even if the laminate tape structure 18 tears/splits, the conductive structure 20 is not believed to be able extend through the tear/split so as to contact the electrical conductor bar 16.

Referring to FIGS. 1 and 2, the dielectric insulating layer 22 may comprise one or more wrapped high voltage insulation layers, each layer comprising a glass backed resin impregnated mica paper tape, wherein the resin may comprise MICALASTIC or THERMALASTIC (MICALASTIC is registered trademark of Siemens Aktiengesellschaft Corporation and THERMALASTIC is a registered trademark of Siemens Energy Inc.). An example of such a glass backed resin impregnated mica paper tape comprises one which is commercially available from Isovalta AG under the product designation Poroband 0410. The one or more insulating layers 22 may be edge lapped over the laminate tape structure 18 and the conductive structure 20 and may extend along about all or a substantial portion of the straight portion 16a of the electrical conductor bar 16. Further, the insulating layers 22 may be disposed about the end turns of the electrical conductor bar 16. As mentioned above, the dielectric insulating layer 22 illustrated in FIG. 1 has been broken away for clarity.

An example conductive outer layer 24 comprises a silicon carbide filled varnish treated glass fabric, one of which is commercially available from Isovalta AG Corporation under the product designation Contafel H. The conductive outer layer 24 may be edge lapped directly over the dielectric insulating layer 22.

The conductive outer layer 24 is substantially fixed to the walls of the stator slot 12 by an impregnating bonding resin that will be described below. The conductive outer layer 24 may be disposed about all or a substantial portion of the straight portion 16a of the electrical conductor bar 16, but is typically not disposed over the end turns of the electrical conductor bar. As mentioned above, the conductive outer layer 24 illustrated in FIG. 1 has been broken away for clarity.

Figure 4:
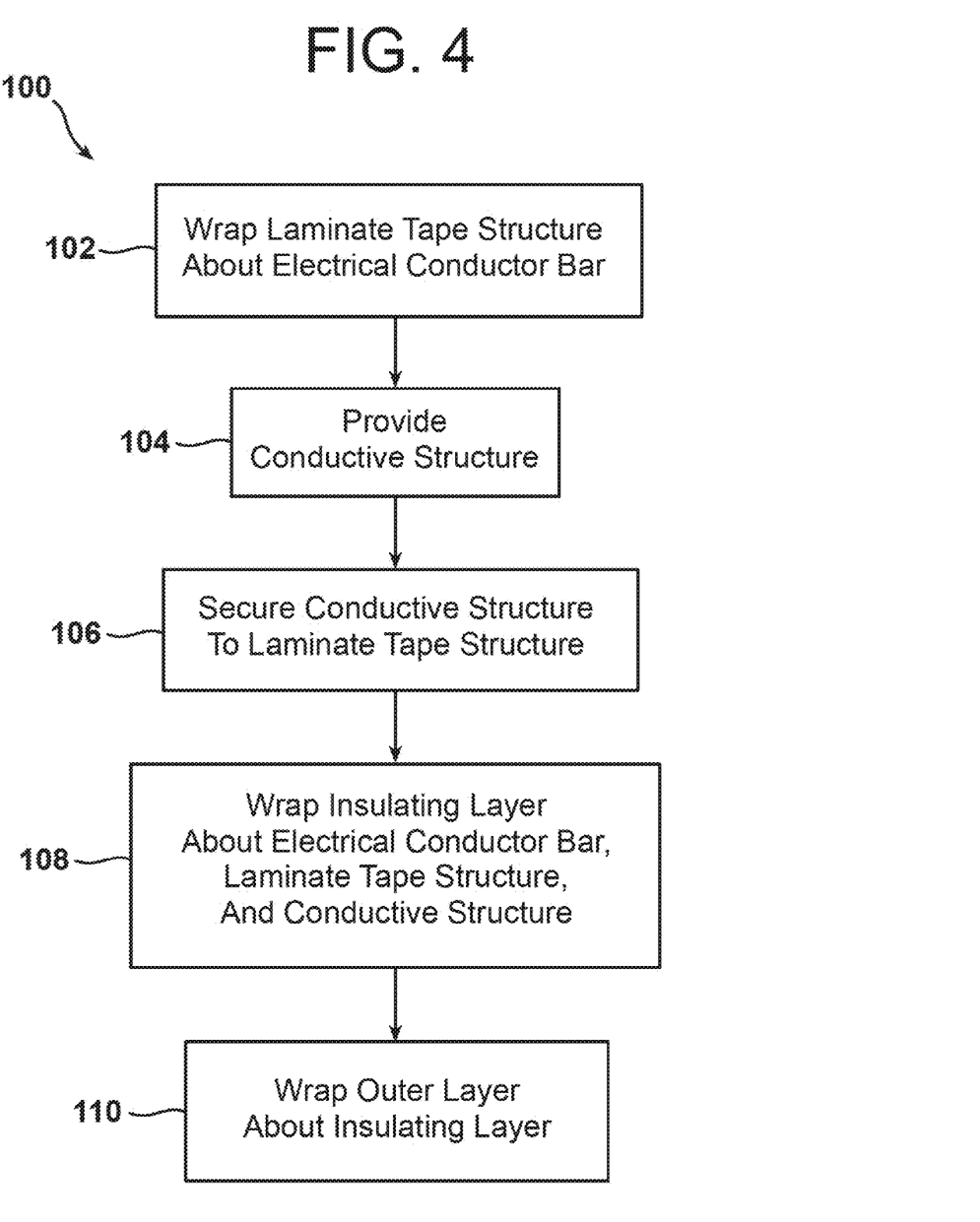
FIG. 4 is a flow diagram illustrating exemplary steps for producing an inner corona protection system for the stator coil of FIG. 1.

Referring to FIG. 4, an exemplary method 100 is illustrated for applying an inner corona protection system 17 to an electrical conductor bar, such as the electrical conductor bar 16 described above. The inner corona protection system 17 functions to minimize internal coil partial discharge activity.

At step 102, a laminate tape structure, such as the laminate tape structure 18 described above, is wrapped about the straight portion 16a of the electrical conductor bar 16. The laminate tape structure 18 comprises the insulative first layer 18A adjacent the straight portion 16a of the electrical conductor bar 16 and the conductive second layer 18B bonded to the first layer 18A. As noted above, the laminate tape structure 18 may have a thickness less than about 0.015 inch, and may be wrapped about the electrical conductor bar 16 with a small overlap. Further, a first end portion 30 of the straight portion 16a of the electrical conductor bar 16 may not be wrapped with the laminate tape structure 18, i.e., the first end portion 30 of the straight portion 16a of the electrical conductor bar 16 may be exposed.

At step 104, a conductive structure is provided, such as the conductive structure 20 described above. As discussed above, the conductive structure 20 includes the first end portion 36, the intermediate portion 38, and the second end portion 40. The first end portion 36 is in contact with the straight portion 16a of the electrical conductor bar 16, e.g., with the exposed first end portion 30 of the straight portion 16a of the electrical conductor bar 16, and may be soldered or otherwise affixed to the conductor bar 16. The intermediate portion 38 is in contact with the conductive second layer 18B of the laminate tape structure 18, but not with the electrical conductor bar 16. The second end portion 40 is in contact with the conductive second layer 18B of the laminate tape structure 18, but is not in contact with the electrical conductor bar 16.

At step 106, the conductive structure 20 is secured to the laminate tape structure 18, such as via one or more tape strips 34.

At step 108, an insulating layer, such as the dielectric insulating layer 22 described above, is wrapped about the straight portion 16a of the electrical conductor bar 16 and the inner corona protection system 17, which comprises the laminate tape structure 18, and the conductive structure 20. The insulating layer 22 may be edge lapped with a small overlap between adjacent wraps, and may also be applied over end turns of the electrical conductor bar 16.

At step 110, a conductive or partially conductive layer, such as the outer layer 24 described above, is wrapped about the portion of the insulating layer 22 that is wrapped about the straight portion 16a of the electrical conductor bar 16.

After the outer layer 24 is wrapped about the portion of the insulating layer 22 at step 110, subsequent steps can be taken to prepare the wrapped stator coil 14 for use in an electrical generator. For example, a single one of the wrapped stator coils 14 may be subjected to a vacuum pressure impregnation (VPI) process, also referred to as a single vacuum pressure impregnation (SVPI) process, which involves impregnating bonding resin, such as an epoxy resin, through the materials of the single wrapped stator coil 14. Alternatively, a plurality of the wrapped stator coils 14 may be combined to form an integral coil structure, in which case the integral coil structure may be subjected to a global vacuum pressure impregnation (GVPI) process, which involves impregnating bonding resin, such as an epoxy resin, through the materials of the integral coil structure. It is noted that, if a VPI process is used to impregnate bonding resin through the materials of a single wrapped stator coil 14, an accelerator, such as zinc naphenate, may be incorporated into the bonding resin impregnated through the materials of the single wrapped stator coil 14. The accelerator facilitates a proper curing of the impregnated bonding resin in the various layers of the wrapped stator coil 14. Alternatively, if a GVPI process is used to impregnate bonding resin through the materials of the integral coil structure, at least one of the insulative first layer 18A of the laminate tape structure 18 and the insulating layer 22 includes the accelerator, in which case the bonding resin need not include the accelerator.

Further subsequent steps may include curing the layers of the wrapped stator coil 14 (or the integral coil structure), and inserting and then fixing the wrapped stator coil 14 (or the integral coil structure) into a stator slot, such as the slot 12 described above. It is noted that the impregnation and curing procedures may be performed prior to the inserting of the wrapped stator coil 14 into the stator slot 12, or the wrapped stator coil 14 may be inserted into the stator slot 12 prior to the impregnation and curing procedures.

The inner corona protection system 17 described herein can be applied in fewer steps and with less material than prior art corona protection systems, which may include a top cap layer, a wrapped layer of mica paper tape, a conductive structure, and a separate conductor layer. Specifically, the corona protection system described herein, which comprises the laminate tape structure 18 and the conductive structure 20, can be applied in a single pass through an automated taping machine (not shown), followed by an affixation of the conductive structure 20 to the laminate tape structure 18, e.g., using the tape strips 34. This is advantageous over prior art application procedures, which may require four separate steps, i.e., applying the top cap, applying the wrapped layer of mica paper tape, applying the conductive structure, and applying the separate conductor layer.

Further, an overall thickness $T_2$ (see FIG. 2) of the corona protection system 17 described herein is less than about 0.015 inch, which is significantly less than the thickness of prior art corona protection systems described above, which may have a thickness of about 0.019-0.023 inches. The reduction in the thickness of the corona protection system of the present invention allows for additional wraps of the dielectric insulating layer 22 (ground wall) to be used when forming the wrapped stator coil 14. The additional wraps of the dielectric insulating layer 22 increases the dielectric strength of the dielectric insulating layer 22, which may increase the efficiency of the generator.

Moreover, the reduction in the thickness $T_2$ of the corona protection system is believed to allow for improved impregnation of the bonding resin. Specifically, it has been found that the impregnation of the bonding resin through the top cap, the wrapped layer of mica paper tape, and the separate conductor layer of prior art corona protection systems is difficult due to the thicknesses of these layers. This is in contrast to the inner corona protection system 17 of the present invention, which comprises fewer layers and is thinner and hence easier for bonding resin to pass through it. It is noted that, impregnation of the resin through the conductive outer layer and the insulating layer (groundwall) is believed to be not as difficult as the impregnation of the resin through the inner corona protection layers that are located closer to the electrical conductor bar. Since the corona protection system 17 described herein is thinner and has fewer layers than prior art corona protection systems, the bonding resin can more easily impregnate through the layers of the corona protection system 17 to reach the electrical conductor bar 16. Thus, impregnation of the bonding resin through the layers of the wrapped stator coil 14 described herein is believed to be improved.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wrapped stator coil for use in a generator comprising:
   an electrical conductor bar;
   a laminate tape structure disposed about said electrical conductor bar comprising:
   an insulative first layer adjacent said conductor bar; and
   a conductive second layer bonded to said first layer;
   a conductive structure having a first end portion, an intermediate portion and a second end portion, said first end portion in contact with said electrical conductor bar, said intermediate portion in contact with said conductive second layer and said second end portion not in contact with said electrical conductor bar; and
   an insulating layer disposed about said conductive structure and said laminate tape.

2. The wrapped stator coil as set out in claim 1, wherein said first layer comprises a mica paper layer.

3. The wrapped stator coil as set out in claim 2, wherein said mica paper layer is glass backed.

4. The wrapped stator coil as set out in claim 3, wherein said second layer comprises a polyester felt loaded with carbon.

5. The wrapped stator coil as set out in claim 1, wherein said laminate tape structure is edge lapped and has a thickness less than about 0.015 inch.

6. The wrapped stator coil as set out in claim 1, wherein said conductive structure comprises a metal strip.

7. The wrapped stator coil as set out in claim 1, wherein said conductive structure is held in place on said laminate tape structure via one or more tape strips.

8. The wrapped stator coil as set out in claim 1, wherein said electrical conductor bar comprises a substantially straight portion, and said laminate tape structure is disposed about said straight portion of said electrical conductor bar.

9. The wrapped stator coil as set out in claim 1, wherein said intermediate portion of said conductive structure is substantially not in contact with said insulative first layer of said laminate tape structure.

10. The wrapped stator coil as set out in claim 1, wherein said conductive structure is located on an opposite side of said conductive second layer of said laminate tape structure than said insulative first layer of said laminate tape structure.

11. The wrapped stator coil as set out in claim 1, wherein said conductive second layer is bonded to said insulative first layer with a bonding resin.

12. A method for applying an inner corona protection system to an electrical conductor bar comprising;
wrapping a laminate tape structure about the electrical conductor bar, the laminate tape structure comprising an insulative first layer adjacent the electrical conductor bar and a conductive second layer bonded to the insulative first layer; and
providing a conductive structure having a first end portion, an intermediate portion and a second end portion, the first end portion being in contact with the electrical conductor bar, the intermediate portion being in contact with the conductive second layer of the laminate tape structure, and the second end portion being out of contact with the electrical conductor bar.

13. The method as set out in claim 12, wherein said wrapping the laminate tape structure comprises wrapping the laminate tape structure with a small overlap.

14. The method as set out in claim 12, wherein the laminate tape structure has a thickness less than about 0.015 inch and the conductive structure comprises a metal strip.

15. The method as set out in claim 14, further comprising securing the metal strip to the laminate tape structure via one or more tape strips.

16. The method as set out in claim 12, wherein the intermediate portion of the conductive structure is substantially not in contact with the insulative first layer of the laminate tape structure.

17. The method as set out in claim 12, wherein the conductive structure is located on an opposite side of the conductive second layer of the laminate tape structure than the insulative first layer of the laminate tape structure.

18. The method as set out in claim 12, wherein said conductive second layer is bonded to said insulative first layer with a bonding resin.

* * * * *